United States Patent [19]
Sato

[11] Patent Number: 5,863,007
[45] Date of Patent: Jan. 26, 1999

[54] SPINNING WHEEL HAVING IMPROVED BALANCE DURING REVERSE ROTATION

[75] Inventor: Jun Sato, Osaka, Japan

[73] Assignee: Shimano, Inc., Japan

[21] Appl. No.: 838,928

[22] Filed: Apr. 23, 1997

[30] Foreign Application Priority Data

Jun. 4, 1996 [JP] Japan .................................. 8-141474

[51] Int. Cl.$^6$ ................................................. A01K 89/00
[52] U.S. Cl. ........................ 242/264; 242/249; 242/270; 242/291; 242/304
[58] Field of Search .................................... 242/234, 244, 242/248, 247, 249, 264, 270, 291, 304, 302, 311, 316

[56] References Cited

U.S. PATENT DOCUMENTS 2,918,227  12/1959  Mauborgne .............................. 242/249
5,350,132   9/1994  Hitomi ..................................... 242/247

FOREIGN PATENT DOCUMENTS 3047379  12/1981  United Kingdom .................... 242/244

*Primary Examiner*—Donald P. Walsh
*Assistant Examiner*—Emmanuel M. Marcelo
*Attorney, Agent, or Firm*—Jeffer, Mangels, Butler & Marmaro LLP

[57] ABSTRACT

A spinning reel of the rotor drag type, with which the rotor can be braked during line play-out, is equipped with a power transmission mechanism. The power transmission mechanism has a pinion gear that is rotatably supported by the reel body in only the line winding direction, and that rotates together with the handle. A clutch mechanism is provided between the pinion gear and the rotor and engages and disengages them. An operating mechanism is used to operate the clutch mechanism for engaging and disengaging. A level winding mechanism moves the spool in the longitudinal direction according to the rotation of the rotor. The power transmission mechanism rotates the rotor and moves the spool in the longitudinal direction together with the rotation of the handle.

14 Claims, 10 Drawing Sheets

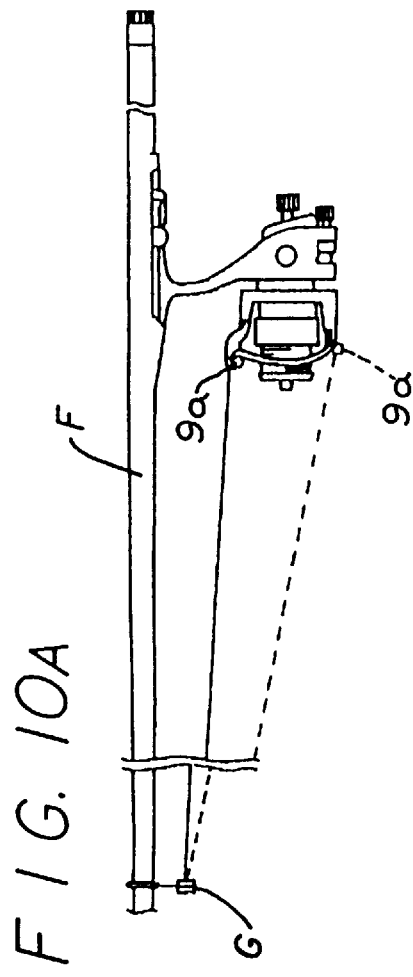
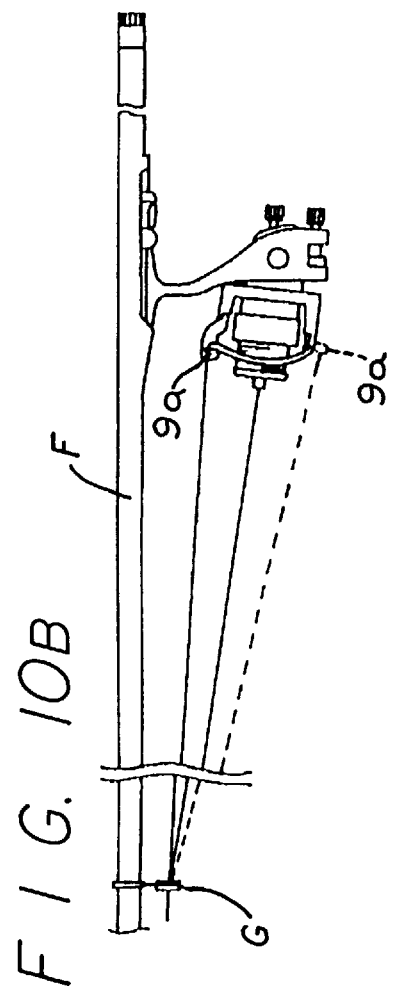

SPINNING WHEEL HAVING IMPROVED BALANCE DURING REVERSE ROTATION

FIELD OF THE INVENTION

The present invention relates to a spinning reel, and more particularly to a rotor drag type of spinning reel that is attached to a fishing rod and that allows the rotor to be braked during play-out of the line.

BACKGROUND OF THE INVENTION

A spinning reel is usually drag-operated by braking the spool while allowing it to rotate in the line play-out direction. When a spool is thus rotated, line kinks accumulate as the line is repeatedly reeled in and played out, and this has led to the development of a rotor drag type of spinning reel with which the drag operation is performed by reversing the rotor in the line play-out direction. A rotor drag type of spinning reel generally has a reel unit that has a handle; a pinion gear that is rotatably supported by the reel unit and that is rotated by a handle; a rotor that is rotatably supported by the reel unit and that is rotated by the pinion gear; a spool that includes a spool shaft that is supported by the reel unit such that it can move in the longitudinal direction; a level winding mechanism that moves the spool shaft in the longitudinal direction together with the pinion gear; and a braking mechanism that brakes the rotor when the rotor is reversed (Japanese Utility Model Publications 3-67574 and 3-56370, for instance). The rotor is balanced so that it will rotate smoothly. The braking mechanism has a brake plate that is engaged and rotated only when the rotor is reversed, and a brake lever that is pivotally supported by the reel unit and that presses the brake plate against the reel unit to effect braking.

With a rotor drag spinning reel having a braking mechanism such as this, the bail is swung into a line release attitude during line play-out. When the fishing line is reeled in, the handle is operated to turn the rotor forward in the line winding direction and wind the fishing line on the spool. Meanwhile, when the fishing line is played out from the spool while the fisherman is fighting a fish, the brake plate is pressed against the reel unit by the brake lever, which brakes the rotor as it reverses, and performs a drag operation.

With the conventional structure discussed above, when the rotor reverses at high speed during a fight with a fish, the handle rotates at high speed via the pinion gear. As a result, even though the rotor is balanced, the reel unit can vibrate since the handle is unbalanced. Also, when a switch is made from line play-out to winding, the handle is difficult to grab unless the brake lever is operated so as to stop or sufficiently decelerate the rotor. Consequently, it is difficult to make an instantaneous switch from line play-out to winding.

A need exists for a rotor drag type of spinning reel in which balance during reversal is improved, and the handle is easier to grab when a switch is made from line play-out to winding.

SUMMARY OF THE PREFERRED EMBODIMENTS

In accordance with one aspect of the present invention, there is provided a rotor drag type of spinning reel that is attached to a fishing rod and that allows the rotor to be braked during play-out of the line. The spinning reel includes a reel unit, a rotor, a spool, and a power transmission mechanism. The reel unit has a reel body having a rear end, a mounting leg member that extends from the reel body and includes a rod mounting member, and a handle that is rotatably supported by the reel body. The rotor is rotatably supported (along its longitudinal axis) by the reel body. The spool is disposed on the reel body in front of the rotor such that it can move in the longitudinal direction. The power transmission mechanism moves the spool in the longitudinal direction and rotates the rotor together with the rotation of the handle. The power transmission mechanism includes a pinion gear that is supported by the reel body and is rotatable in only the line winding direction and that rotates together with the handle. Engagement means are provided between the pinion gear and rotor and engage or disengage them. Operation means are provided for operating the engagement means. Level winding means are also provided for moving the spool in the longitudinal direction responsive to the rotation of the handle.

In using the inventive spinning reel, the bail of the reel is put into a line release attitude during line play-out. When the fishing line is to be reeled in, if the handle is rotated in the line winding direction in a state in which the engagement means has been engaged by the operation means, then the rotation thereof will be transmitted to the rotor via the pinion gear and the engagement means, and the rotor will rotate in the line winding direction. Meanwhile, when a fish bites and the rotor reverses in the line play-out direction, if the rotor and the pinion gear are engaged by the operation means, then the pinion gear will not be able to reverse with respect to the reel body, so the rotor will be braked according to the engagement force of the engagement means. Since the pinion gear does not reverse at this time, neither does the handle. When the handle is rotated, the spool is moved in the longitudinal direction by the level winding means, and the fishing line is uniformly wound on the spool.

Since neither the pinion gear nor the unbalanced handle rotates during the reverse rotation of the rotor, there is better balance during reverse rotation and the handle is easy to grasp when a switch is made from line play-out to line winding.

In a first preferred embodiment, the inventive reel further includes engagement holding means for holding the engagement means in an engaged state. Since the engagement means is held in an engaged state, there is no need to operate the operation means during line winding to maintain the engagement means in an engaged state.

In another preferred embodiment, the engagement means transmits power by means of a frictional force, and the operation means adjusts the frictional force so as to perform the engagement or disengagement. In this embodiment, the desired braking force can be obtained during reverse rotation of the rotor by adjusting the frictional force with the operation means so that the engagement means performs its engagement or disengagement operation.

In an additional preferred embodiment, the operation means has an operating handle that moves with respect to the reel unit and adjusts the frictional force. In this embodiment, the frictional force can be adjusted merely by moving the operating lever with respect to the reel unit.

According to a more specific embodiment, the operating lever is movably positioned on the reel unit adjacent (in close proximity to) the mounting leg member, and is moved so as to adjust the frictional force by an operation in which the fishing rod, to which the spinning reel is attached, is grasped. In this embodiment, since the frictional force (braking force) can be adjusted by moving the operating lever by means of an operation in which the fishing rod is grasped, the braking force can be adjusted with the hand gripping the fishing rod while the handle is operated with the other hand, which allows the braking force to be adjusted easily and at the right timing.

In still another preferred embodiment, the operation means has a rotating member that, when rotated, moves in the longitudinal direction of the reel unit and adjusts the frictional force. Since the engagement means can be operated by rotating the rotating member so as to move it in the longitudinal direction, the frictional force can be adjusted precisely.

In a further preferred embodiment, the rotor is rotatably supported by a cylindrical member that rotates integrally with the pinion gear. Since the rotor and the pinion gear are positioned close to each other, the structure of the engagement means is simpler.

In still another preferred embodiment, the level-winding means rotates together with the rotor and moves the spool in the longitudinal direction. Even though the pinion gear does not rotate during rotor reversal, the spool will still move reliably in the longitudinal direction as long as the rotor is rotating, so the fishing line is played out smoothly during rotor reversal.

In an additional preferred embodiment, the spinning reel includes linking means for linking the reel body to the mounting leg member so that it can pivot around an axis parallel to the rotational axis of the handle, and position adjustment means for adjusting the position of the reel body. In this embodiment, the fluttering of the fishing line as it is played out from the rotor (which occurs when the line moves up and down and the apparent braking force fluctuates) can be lessened by adjusting the position of the reel body so that the rotational axis of the rotor approaches the line that connects the reel and the line guide closest to the reel on the fishing rod.

In yet another preferred embodiment, the linking means links the reel body to the mounting leg member so that the reel body can pivot around the rotational axis of the handle. Since the handle shaft doubles as a pivot shaft, the structure of the mechanism is simpler.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 10 is a diagram illustrating how to set the position of the reel body; and

DETAILED DESCRIPTION OF THE PREFERRED EMBODIMENTS

Figure 1:
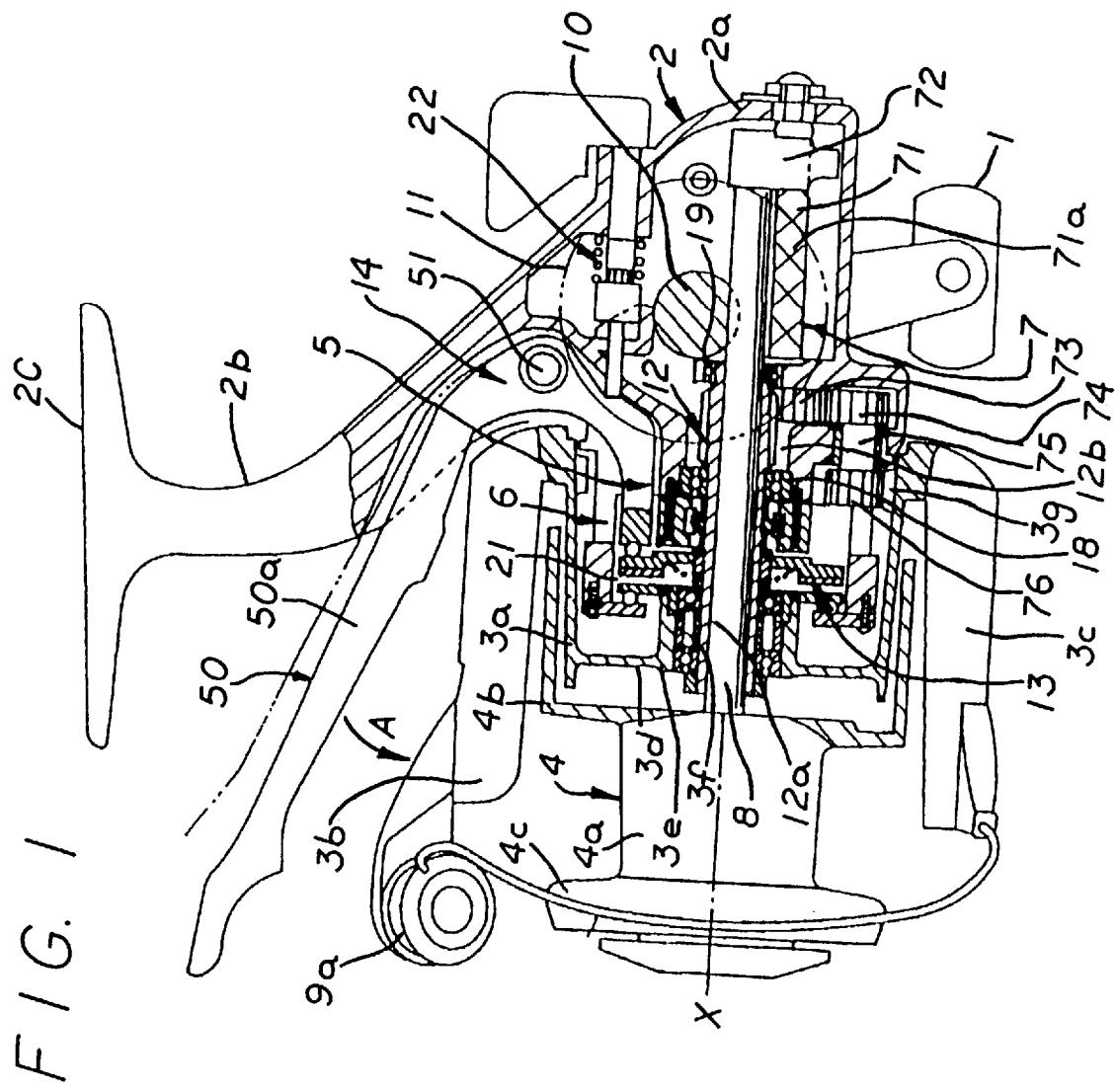
FIG. 1 is a cut-away side view of the spinning reel pertaining to one embodiment of the present invention.

The spinning reel pertaining to one embodiment of the present invention shown in FIG. 1 comprises a reel unit 2 equipped with a handle 1. Rotor 3 is rotatably supported around the longitudinal axis at the front of the reel unit 2. Spool 4 is positioned in front of the rotor 3 and winds the fishing line.

The reel unit 2 has a reel body 2a, at the upper portion of which is formed a mounting leg member 2b for attaching the spinning reel to a fishing rod. The upper surface of the mounting leg member 2b is a rod mounting member 2c that comes into contact with the fishing rod. The interior of the reel body 2a is provided with a power transmission mechanism 5 that rotates the rotor 3 together with the rotation of the handle 1, and moves the spool 4 in the longitudinal direction.

Figure 2:
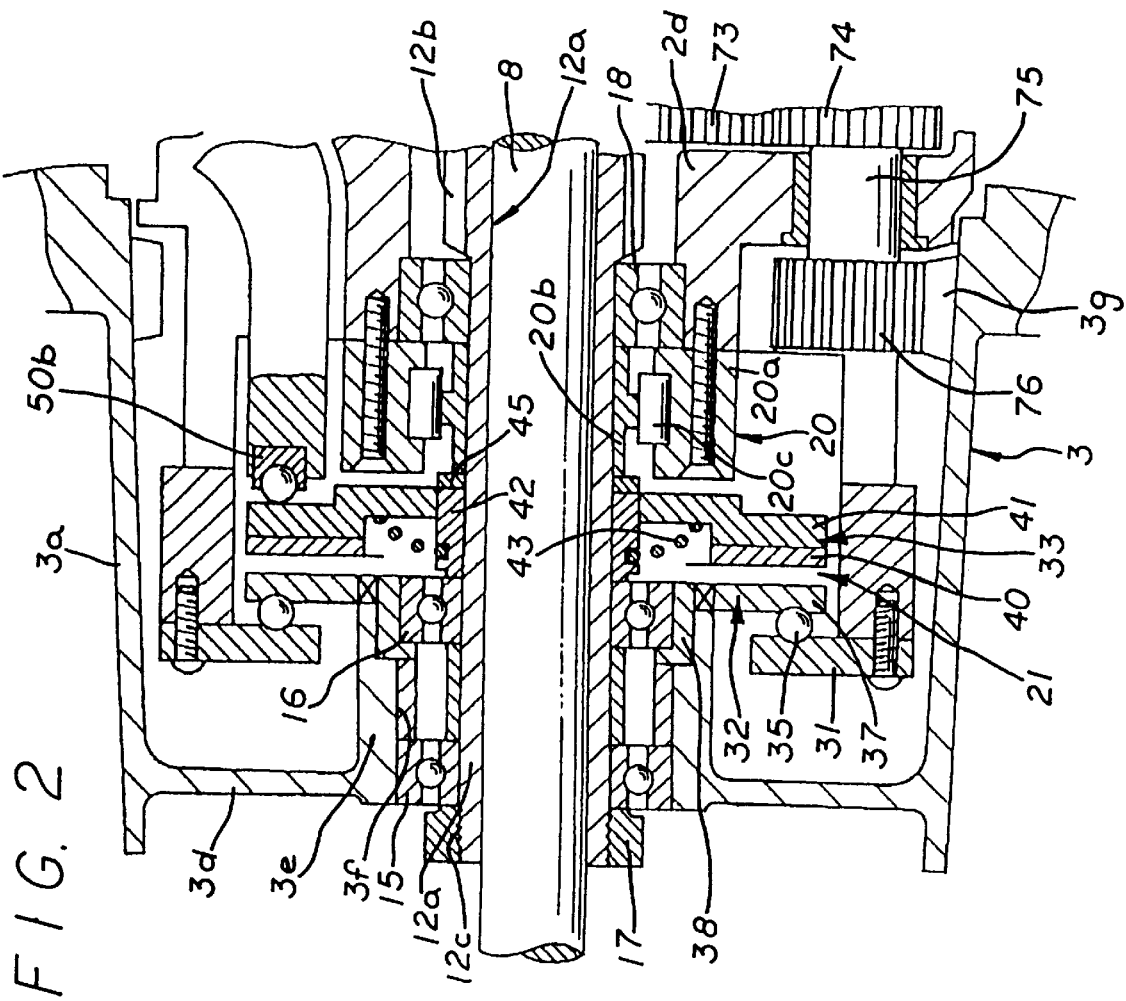
FIG. 2 is an enlarged detail cross section of an embodiment of the engagement component.

The rotor 3 has a cylindrical member 3a, and a first rotor arm 3b and second rotor arm 3c that are provided facing each other on the sides of the cylindrical member 3a. A boss 3e having a through hole 3f is formed in the center portion of the front wall 3d of the cylindrical member 3a. As shown in FIG. 2, two bearings 15 and 16 are positioned apart from each other in this through hole 3f, and these bearings 15 and 16 allow the rotor 3 to be rotatably mounted on a pinion gear 12 (discussed below). Inside teeth 3g used for power transmission are formed in the peripheral direction around the inner surface at the rear end of the cylindrical member 3a. A bail arm 9 having a line roller 9a and a bail 9b that guide the fishing line is pivotally provided between the tip of the first rotor arm 3b and the tip of the second rotor arm 3c.

The spool 4 is positioned between the first rotor arm 3b and the second rotor arm 3c of the rotor 3, and is fixed at the tip of a spool shaft 8 that extends in the longitudinal direction. The spool 4 has a spooling drum 4a around the outside of which is wound the fishing line; a skirt 4b that is integrally formed at the rear of the spooling drum 4a; and a flange 4c that is fixed to the front end of the spooling drum 4a. The spool shaft 8 can be moved in the longitudinal direction by a level winding mechanism 7.

The power transmission mechanism 5 includes a rotor drive braking mechanism 6 that is used to rotate and brake the rotor 3, and a level winding mechanism 7 that is used to uniformly wind the fishing line onto the spool 4 by moving the spool 4 in the longitudinal direction along the rotational axis X (i.e., the longitudinal axis).

The rotor drive braking mechanism 6 has a master gear 11 that rotates along with a handle shaft 10 to which the handle 1 is fixed. A pinion gear 12 meshes with master gear 11. Clutch mechanism 13 engages and disengages the pinion gear 12 and the rotor 3. Operating mechanism 14 operates the clutch mechanism 13.

The handle shaft 10 extends transversely, to the left and right, and is rotatably supported by the reel body 2a.

Figure 3:
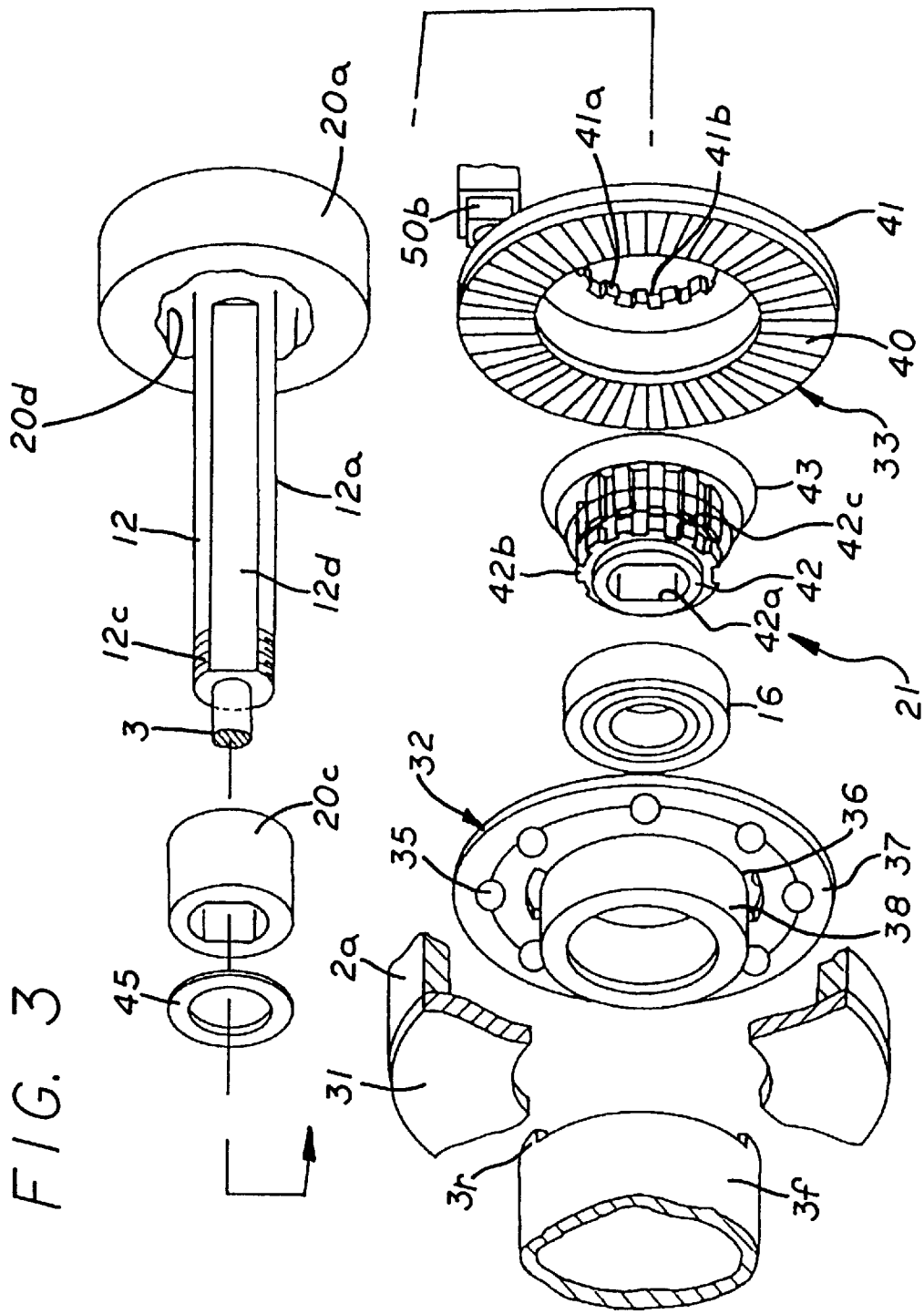
FIG. 3 is an exploded oblique view of the engagement component of FIG. 2.

The pinion gear 12 is formed in the shape of a hollow cylinder, and the spool shaft 8 passes through the interior of pinion gear 12, as shown in FIG. 2. The pinion gear 12 is rotatably supported on the reel body 2a by bearings 18 and 19. The pinion gear 12 has a cylindrical member 12a and teeth 12b that are formed at the rear of the cylindrical member 12a. The cylindrical member 12a passes through the center of the rotor 3 and extends toward the spool 4, and threads 12c are formed at the front of cylindrical member 12a. The bearings 15 and 16 are mounted on cylindrical member 12a, and the rotor 3 is rotatably supported on cylindrical member 12a. A nut 17 is threaded onto the threads 12c, and fixes the bearing 15. Parallel chamfered surfaces 12d that are used to prevent rotation are formed on the cylindrical member 12a, as shown in FIG. 3. A roller-type one-way clutch 20 is installed between the pinion gear 12 and the reel body 2a in front of the bearing 18, and the pinion gear 12 is only able to rotate in the line winding direction due to the one-way clutch 20. The one-way clutch 20 has an outer wheel 20a that is fixed to the reel body 2a, with sawtooth-like bumps 20d formed on the inside of this outer wheel 20a. An inner wheel 20b is non-rotatably mounted to the pinion gear 12. A transmission roller 20c is positioned between the outer wheel 20a and the inner wheel 20b.

The clutch mechanism 13 has an engagement component 21 and an engagement holding component 22 that holds the engagement component 21 in an engaged state.

As shown in FIGS. 2 and 3, the engagement component 21 has a receiving member 31 that is fixed to the rear end of the reel body 2a. Receiving plate 32 is movably and rotatably mounted on the rotor 3 to the rear of and facing the receiving member 31. Clutch plate 33 is non-rotatably but movably mounted on the pinion gear 12 to the rear of and facing the receiving plate 32.

The receiving member 31 is a disk-shaped member that is screwed to the distal end of the front flange 2d of the reel body 2a. Metal balls 35, which are held in placed by a holder (not shown), are equidistantly arranged in the peripheral direction between this receiving member 31 and the receiving plate 32. The receiving member 31, receiving plate 32, and metal balls 35 make up a thrust bearing.

The receiving plate 32 has a disk component 37 that has defined therein a circular hole 36 into which are fitted a pair of upper and lower tabs 3h formed at the rear end of the boss 3e of the rotor 3. Cylinder component 38 is fitted into the boss 3e.

The clutch plate 33 has a metal clutch disk 40 that is positioned on the receiving plate 32 side, and a disk-shaped disk attachment component 41 to which the clutch disk 40 is fixed. Cylindrical linking member 42 supports the disk attachment component 41 such that it cannot rotate, but can move in the axial direction. A through hole 41b having inner splines 41a is formed in the center of the disk attachment component 41. An oval through hole 42a that engages with the chamfered surfaces 12d is formed in the center of the linking member 42, and outer splines 42b that mesh with the inner splines 41a are formed on the outer peripheral surface of the linking member 42. As a result, the linking member 42 is non-rotatably linked to the pinion gear 12. Also, a notch 42c is formed in the peripheral direction around the outer peripheral surface. In this notch 42c is stopped the smaller-diameter end of a conical coil spring 43 that urges the clutch plate 33 rearward. The larger-diameter end of the conical coil spring 43 is stopped at the front surface of the disk attachment component 41. A washer 45 is positioned between the linking member 42 and the inner wheel of the one-way clutch 20.

The operating mechanism 14 has an operating lever 50. The operating lever 50 is pivotally supported by a support shaft 51 on the reel body 2a in the boundary area between the reel body 2a and the mounting leg member 2b, and is urged in the direction of arrow A (counterclockwise) by an urging member (not shown). The operating lever 50 has a lever component 50a that curves out from the support shaft 51 and extends diagonally upward, and an engagement/disengagement actuator 50b provided to the distal end that curves out from the support shaft 51 and extends diagonally forward. Metal balls 52 are rotatably fitted into the engagement/disengagement actuator 50b. This engagement/disengagement actuator 50b presses the rear face of the clutch plate 33, moves the clutch plate 33 forward, and presses it against the receiving plate 32.

Figure 4:
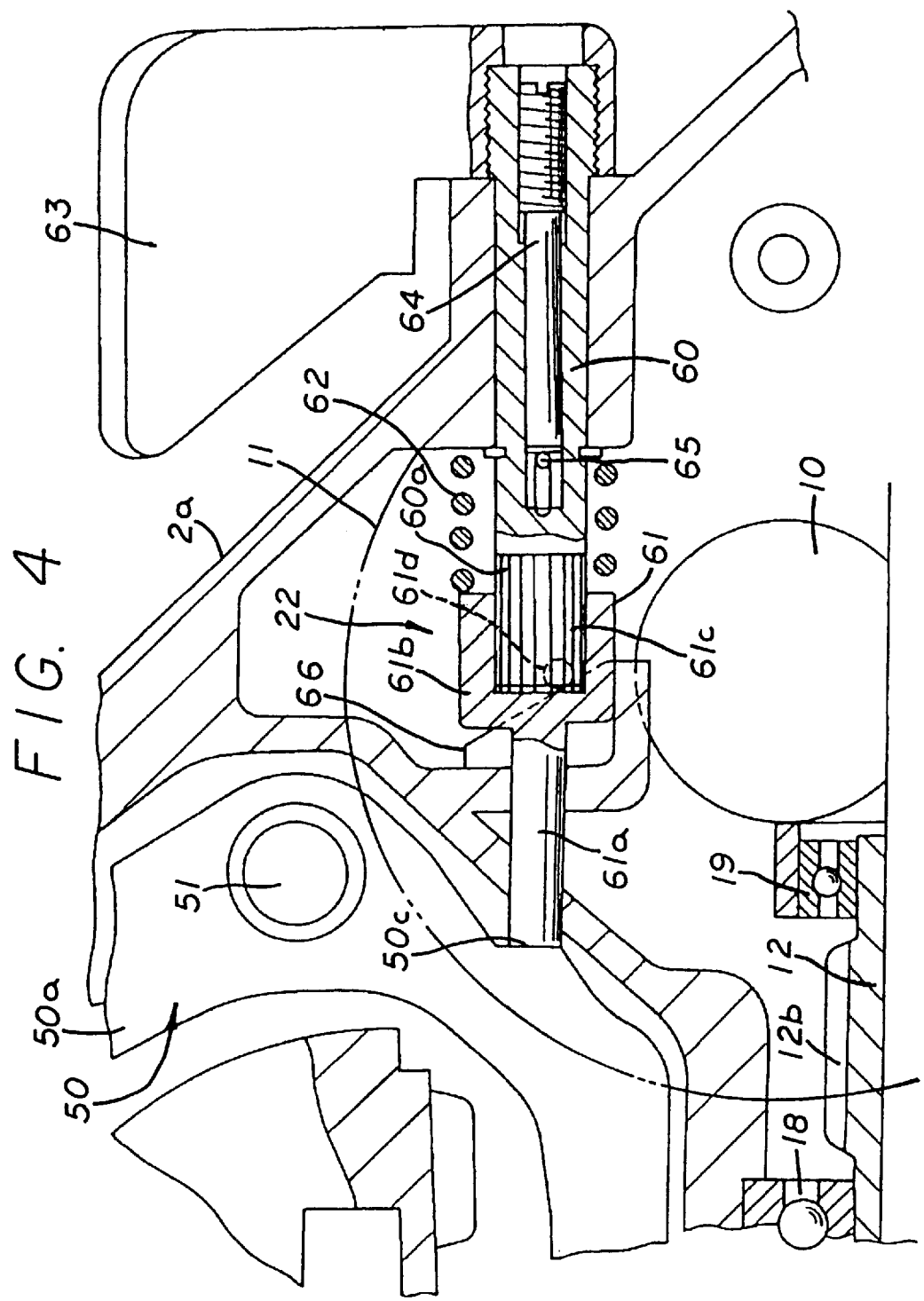
FIG. 4 is an enlarged detail cross section of an embodiment of the engagement holding component.

The engagement holding component 22 switches the operating lever 50 between a released position (shown in FIG. 4) and an engaged position (shown in FIG. 5), and holds the operating lever 50 in an engaged state. The engagement holding component 22 has a shaft 60 that is rotatably supported around an axis parallel to the spool shaft 8 at the rear of the reel body 2a. Movable shaft 61 is supported at the distal end of the shaft 60 such that it cannot rotate, but can move in the axial direction. Adjustment spring 62 is positioned between the shaft 60 and the movable shaft 61 and urges the movable shaft 61 forward.

Figure 5:
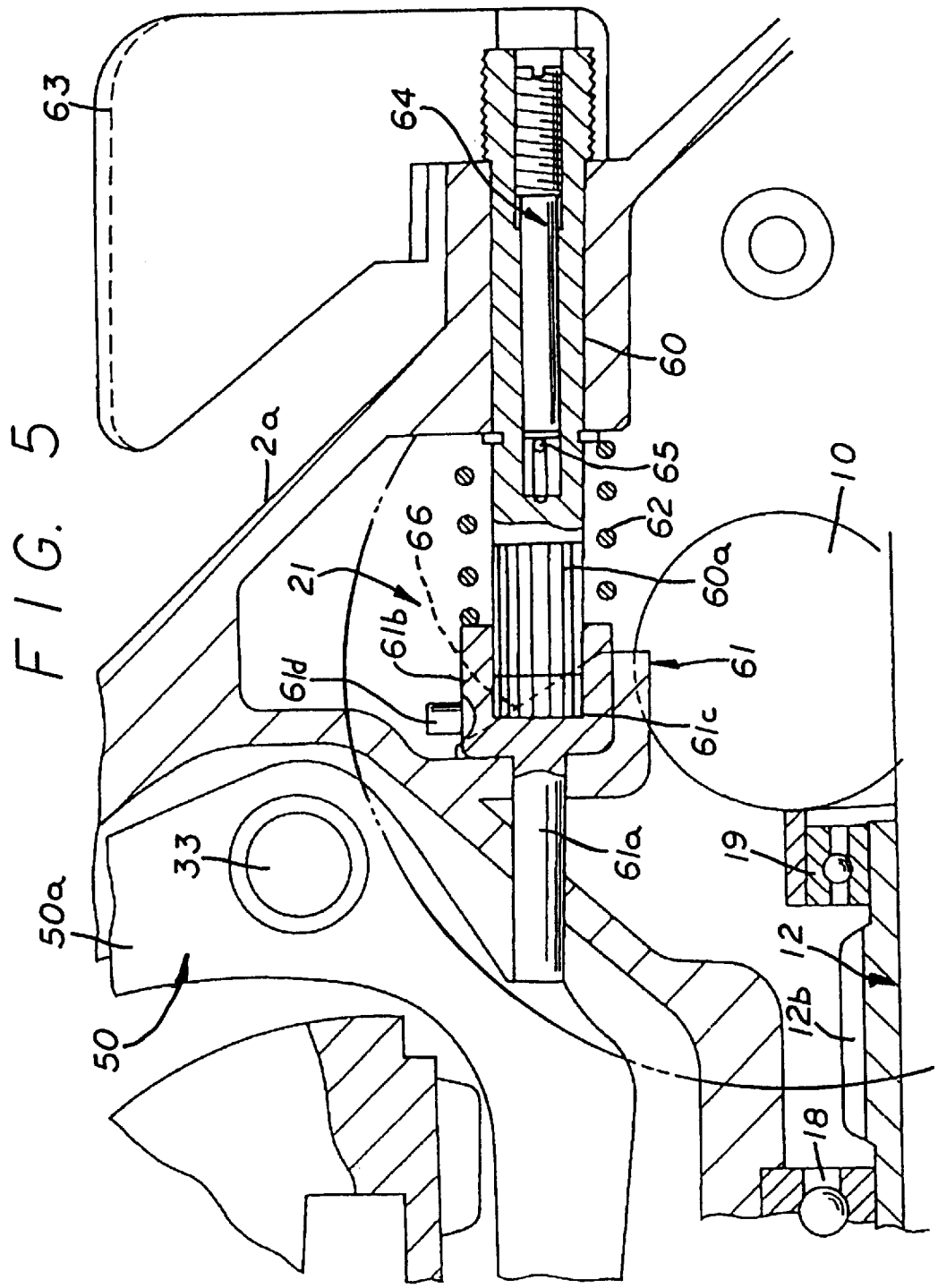
FIG. 5 is an enlarged detail cross section illustrating the action of the engagement holding component of FIG. 4.

A lever 63 is non-rotatably attached to the rear end of the shaft 60, and the shaft 60 is rotated 90 degrees by the lever 63 between 45 degrees to the left (the position in FIG. 4) and 45 degrees to the right (the position in FIG. 5). An adjustment screw 64 is screwed into the axial center of the shaft 60. The distal end of the adjustment screw 64 contacts an adjustment pin 65 that is mounted over the diameter line of the shaft 60 such that it can move in the axial direction. The ends of the adjustment pin 65 extend outward from the shaft 60, and are in contact with the rear end of the adjustment spring 62. The spring strength of the adjustment spring 62 (the force at which the movable shaft 61 is urged) can be adjusted by moving the adjustment pin 65 back and forth in the axial direction by means of the adjustment screw 64. Adjusting this urging force allows the braking force in an engaged state to be adjusted as desired. Also, outer splines 60a that are used for engagement with the movable shaft 61 are formed at the distal end of the shaft 60.

The movable shaft 61 has on its distal end a striking component 61a that strikes a striking surface 50c formed on the operating lever 50. The striking component 61a is movably supported by the reel body 2a. The movable shaft 61 also has a large diameter component 61b that is contiguous with the striking component 61a. Inner splines 61c that mesh with the outer splines 60a of the shaft 60 are formed in the center of the large diameter component 61b. A cylindrical cam lobe 61d that protrudes radially is provided to the outer peripheral surface of the large diameter component 61b. This cam lobe 61d is positioned such that it moves along an inclined cam 66 formed in the reel body 2a. This cam lobe 61d moves along the inclined cam 66 as a result of the urging force of the adjustment spring 62 and the rotation of the shaft 60, and this causes the movable shaft 61 to advance or retract in the axial direction, which rotates the operating lever 50.

The level winding mechanism 7 is used to uniformly wind the fishing line on the spool 4 by moving the spool shaft 8 in the longitudinal direction and thereby causing the spool 4 to move back and forth in the same direction. As shown in FIGS. 1 and 2, the level winding mechanism 7 has a spiral shaft 71 that is positioned beneath the spool shaft 8. A slider 72 moves in the longitudinal direction along the spiral shaft 71; the rear end of the spool shaft 8 is fixed to slider 72. A first intermediate gear 73 is fixed to the distal end of the spiral shaft 71. Two intersecting spiral grooves 71a are formed on the outer peripheral surface of the spiral shaft 71. The slider 72 has an engagement member (not shown) that engages with the spiral grooves 71a, and is guided parallel to the spool shaft 8 by a guide mechanism (not shown). The first intermediate gear 73 meshes with a second intermediate gear 74 positioned under it. The second intermediate gear 74 is fixed to the rear end of an intermediate shaft 75 that is rotatably supported by the front flange 2d of the reel body 2a. A third intermediate gear 76 that meshes with the inside teeth 3g of the rotor 3 is fixed to the distal end of the intermediate shaft 75.

With this level winding mechanism 7, as the rotor 3 rotates, its rotational force is transmitted to the spiral shaft 71 via the inside teeth 3g and the third, second, and first intermediate gears 76, 74, and 73, which results in the slider 72 moving back and forth in the longitudinal direction.

During casting, the bail arm 9 is lowered to a line release attitude, and the fishing rod is swung in a casting motion. As a result, the fishing line wound around the outside of the spool 4 is played out by the weight of the tackle.

When the fishing line is to be reeled in, the bail arm 9 is returned to a line winding attitude. Also, the lever 63 is rotated from 45 degrees left to 45 degrees right to put the engagement component 21 in an engaged state. Specifically, when the lever 63 is thus rotated, the shaft 60 pivots, and the movable shaft 61 engaged with the splines also pivots. When the movable shaft 61 pivots, the cam lobe 61d provided to the outer peripheral surface of the large diameter component 61b thereof moves forward along the inclined cam 66, the movable shaft 61 advances, the distal end of the striking component 61a strikes the striking surface 50c of the operating lever 50, and the operating lever 50 is rotated to its engagement position. When the operating lever 50 is rotated to its engagement position, the engagement/disengagement actuator 50b presses against the rear surface of the clutch plate 33 and causes the clutch plate 33 to move forward and press against the receiving plate 32. As a result, the engagement component 21 is held in an engaged state.

When the handle 1 is rotated in the line winding direction in this state, this rotational force is transmitted to the pinion gear 12 via the handle shaft 10 and the master gear 11. Since the rotation is in the line winding direction at this point, the pinion gear 12 is allowed to rotate by the one-way clutch 20. The rotational force transmitted to the pinion gear 1 2 is transmitted via the engagement component 21 (which is in an engaged state) to the rotor 3. When the rotor 3 rotates, its rotation is transmitted via the inside teeth 3g to the level winding mechanism 7, the spool shaft 8 moves back and forth in the longitudinal direction, and the fishing line is uniformly wound onto the spool 4.

When the rotor 3 is reversed during a fight with a fish, the lever 63 is rotated to 45 degrees left to put the engagement component 21 in a released state. When the lever 63 is rotated from 45 degrees right to 45 degrees left, the cam lobe 61d retracts along the inclined cam 66, and the movable shaft 61 retracts. The operating lever 50 is then returned to its release position by an urging member (not shown). The operating lever 50 is operated in this state while a fish is on the line. When the fishing line is pulled by the fish and the rotor 3 is reversed, the force is transmitted to the receiving plate 32, and the receiving plate 32 rotates integrally with the rotor 3. If the operating lever 50 is then swung in the opposite direction from arrow A in FIG. 1, the engagement/disengagement actuator 50b will press against the clutch plate 33 and cause it to come into contact with the receiving plate 32, which has received the clutch plate 33 in the axial direction as a result of the receiving member 31. At this point, the pinion gear 12 cannot be reversed by the one-way clutch 20, so the clutch plate 33, which is non-rotatably linked to the pinion gear 12, does not reverse. As a result, a braking action is exerted on the reversing rotor 3. Increasing or decreasing the force applied to this operating lever 50 allows the braking force to be adjusted, which allows the amount of rotor 3 reversal to be adjusted as desired.

Since the pinion gear 12 does not rotate at this point, the master gear 11 does not rotate, nor does the handle 1. Accordingly, there is better balance during reversal, and the handle is easy to grasp when a switch is made from line play-out to winding. There is also less noise during reversal since there is less rotating mass.

Meanwhile, when the rotor 3 reverses, its rotational force is transmitted via the inside teeth 3g to the level winding mechanism 7, the spiral shaft 71 rotates, and the slider 72 moves back and forth. As a result, the fishing line wound on the spool 4 is smoothly played out.

When the reel is stowed in order to move to another fishing spot, the lever 63 is rotated from 45 degrees left to 45 degrees right to put the engagement component 21 in an engaged state. As a result, the rotor 3 is prevented from reversing, and there will be no unwanted play-out of the fishing line wound on the spool 4 due to the weight of the tackle or the like.

Figure 6:
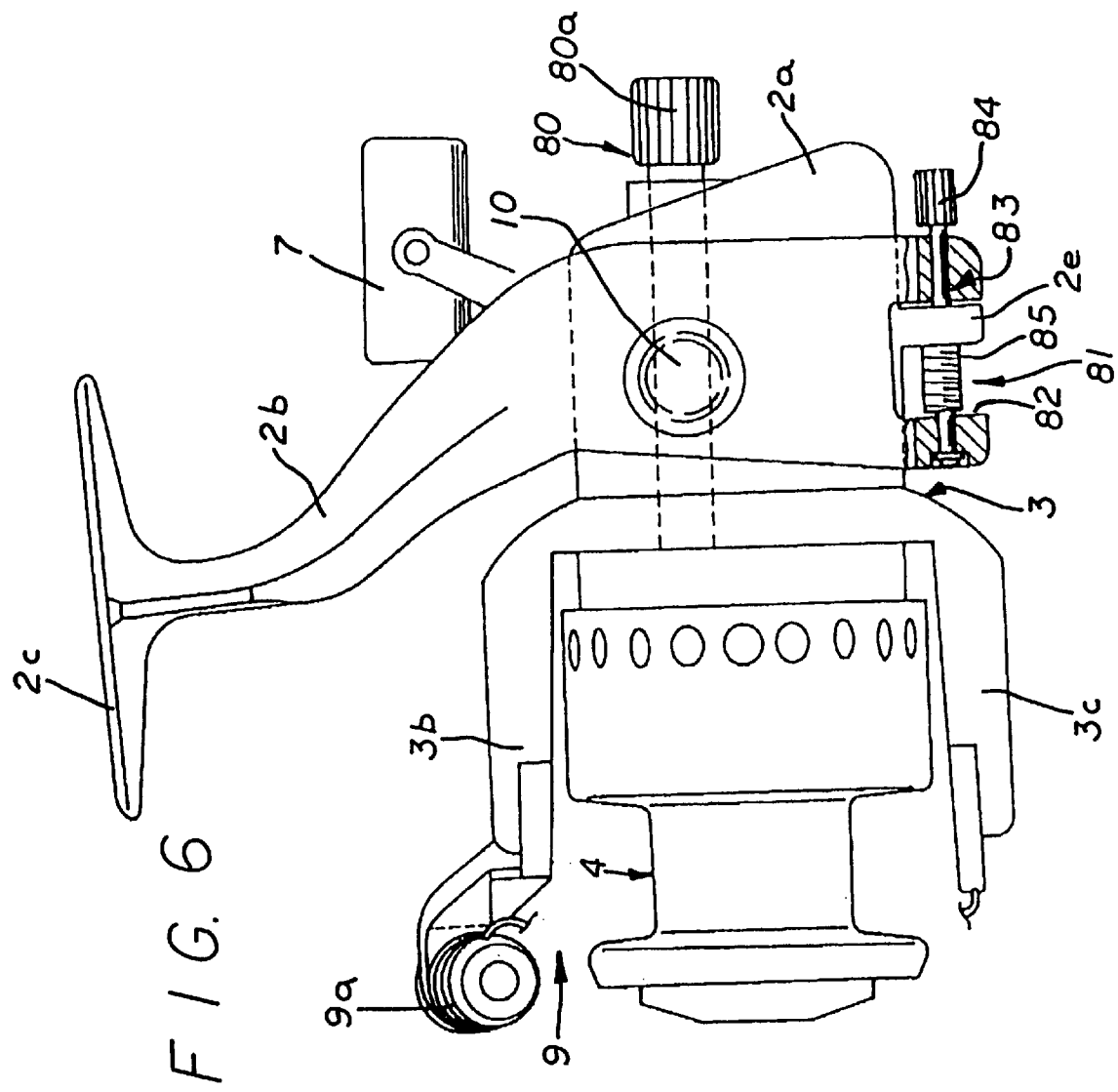
FIG. 6 is a side view of another embodiment of the spinning reel of the present invention.
Figure 7:
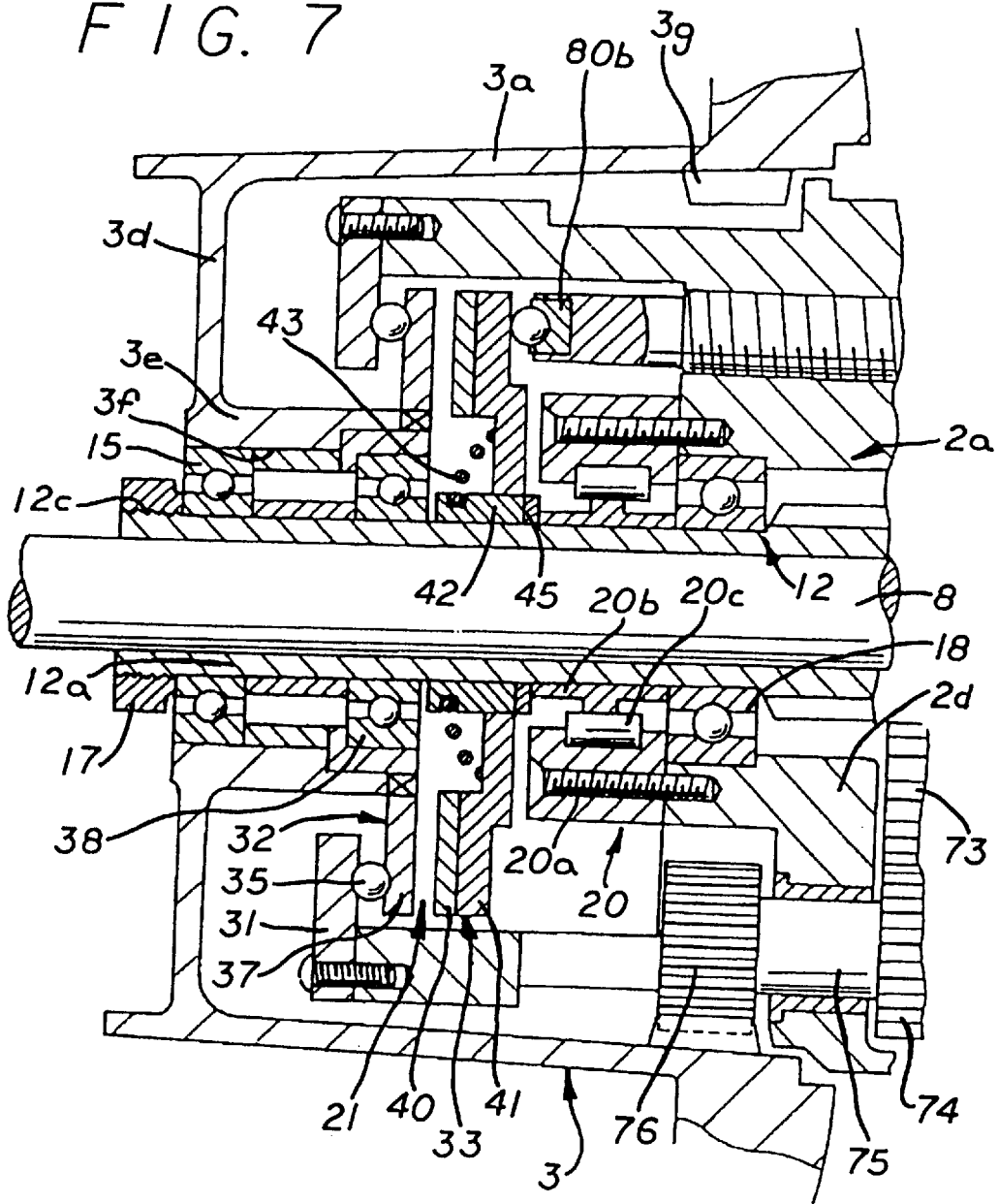
FIG. 7 is diagram thereof corresponding to FIG. 2.

An alternative embodiment is shown in FIG. 6. Reel body 2a is pivotally mounted on the mounting leg member 2b. Rod-shaped operating member 80 having an engagement actuator 80b on its distal end, as shown in FIG. 7, is threaded onto the front flange 2d of the reel body 2a. This operating member 80 also has on its rear end a dial 80a that is used for rotary operation. When this dial 80a is rotated, the operating member 80 moves in the longitudinal direction, which allows the engagement component 21 to be engaged or disengaged, and allows the fine tuning of the braking force (drag force) as desired.

As shown in FIG. 6, the mounting leg member 2b links the reel body 2a such that it can rotate around the handle shaft 10. A position adjustment component 81 that is used to adjust the position of the reel body 2a is provided in a depression 82 formed at the lower end of the mounting leg member 2b. The position adjustment component 81 has an adjustment shaft 83 that is positioned parallel to the spool shaft 8 in the depression 82. An engagement component 90 is provided to the reel body 2a.

The adjustment shaft 83 is rotatably supported at the lower end of the mounting leg member 2b on both sides of the depression 82. A knob 84 used for adjusting the position of the reel body 2a is formed on the rear end of the adjustment shaft 83. Threads 85 are formed on that portion of the adjustment shaft 83 positioned in the depression 82.

Figure 8:
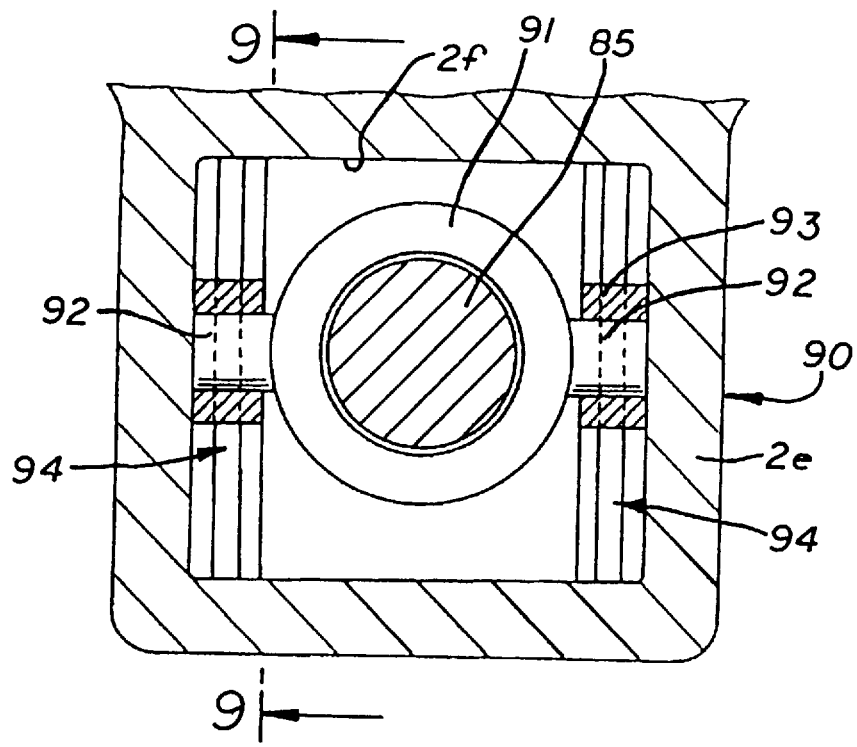
FIG. 8 is a partial cross section of an embodiment of the position adjustment component.
Figure 9:
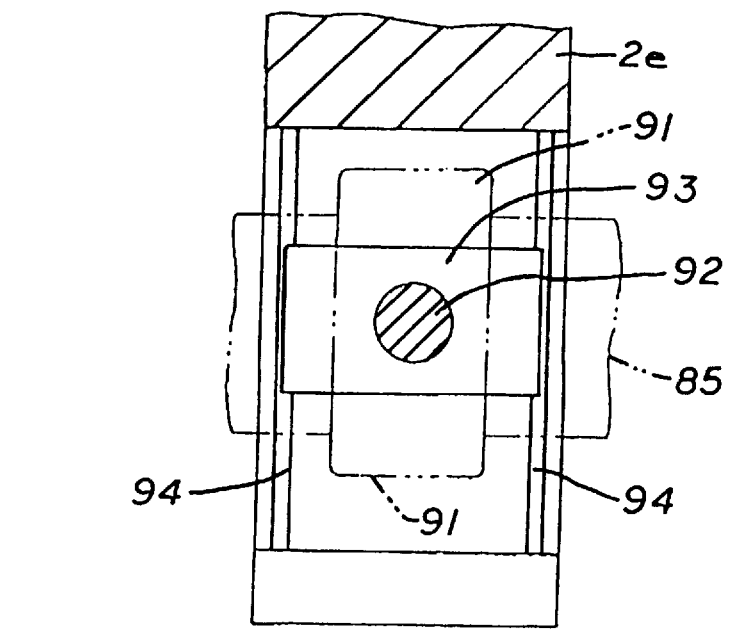
FIG. 9 is a cross section along the IX—IX line in FIG. 8.

A protrusion 2e that protrudes downward is formed at the lower end of the reel body 2a. As shown in FIGS. 8 and 9, a rectangular through hole 2f (which goes through in the longitudinal direction) is formed in the interior of this protrusion 2e, and the engagement component 90 is provided to this through hole 2f. The engagement component 90 has a nut 91 that is threaded onto the threads 85. The nut 91 has a shaft 92 that protrudes outward on both sides. This shaft 92 is rotatably supported by a bearing 93. This bearing 93 is supported such that it can move up and down by a guide component 94 formed in the through hole 2f.

With a position adjustment component 81 structured as shown, the adjustment shaft 83 is rotated by the turning of the knob 84, which results in the nut 91 that is threaded onto the threads 85 moving in the longitudinal direction. As a result, the reel body 2a pivots around the handle shaft 10.

As shown in FIG. 10 (A), if this pivot angle is not adjusted, the angle and the distance up to the first guide G (the guide closest to the reel) of the fishing rod F will be different at the position where the line roller 9a is close to the fishing rod F and the position where it is away from it. Accordingly, the tensile force acting on the fishing line will vary even though the torque is constant during reversal, and when braking is applied during rotor reversal, the fishing line will flutter up and down and there will be fluctuation in the apparent braking force on the fishing line. As shown in FIG. 10 (B), however, if the pivot angle is adjusted so that the axis of the spool 4 is facing the first guide G of the fishing rod F, then the angle and distance up to the first guide G of the fishing rod F will be roughly equal at the two positions, so this fluttering will be eliminated. This adjustment of the pivot angle will vary with the fishing rod in question. In the event that the angle up to the first guide varies even with a given fishing rod depending on the degree of bending due to differences in drag force, then the pivot angle should be adjusted according to the drag force. In this case, the pivot angle should be adjusted such that drag flutter will be eliminated by aligning the axis of the spool 4 with the first guide G while the drag force is adjusted with the dial 80a and the fishing line is actually played out to reverse the rotor 3.

Figure 11:
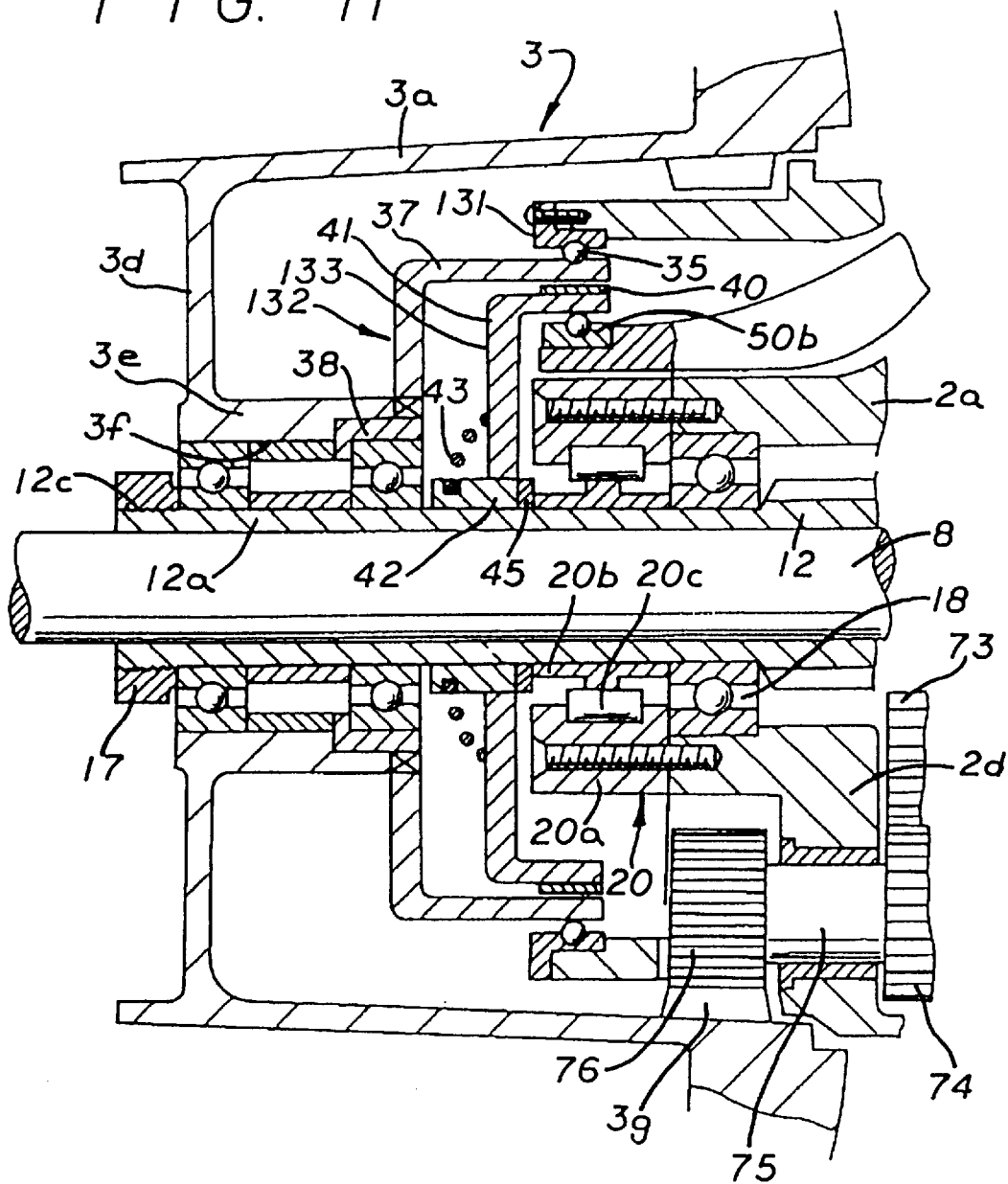
FIG. 11 is a diagram of another embodiment, corresponding to FIG. 2.

The structure of the engagement component 21 is not limited to the above embodiment. As shown in FIG. 11, the receiving plate 132 and clutch plate 133 may consist of cup-shaped members, and a radial bearing may be made up of a ring-shaped receiving member 131, the receiving plate 32, and the metal balls 35. In this case, the clutch plate 33 is lowered by pivoting, which presses the clutch plate 33 against the receiving plate 32.

With the spinning reel pertaining to the present invention, neither the pinion gear nor the handle rotates during rotor reversal, so there is better balance during reversal, and the handle is easy to grab when a switch is made from line play-out to winding.

What is claimed is:

1. A rotor drag spinning reel comprising:
   (i) a reel unit comprising
      (a) a reel body having a rear end,
      (b) a mounting leg member that extends from said reel body and includes a rod mounting member, and
      (c) a handle that is rotatably supported by said reel body;
   (ii) a rotor that is rotatably supported by said reel body;
   (iii) a spool disposed on said reel body in front of said rotor such that said spool can move in the longitudinal direction; and
   (iv) a power transmission mechanism for moving said spool in the longitudinal direction and rotating said rotor together with rotation of said handle, said mechanism comprising
      (a) a pinion gear that is supported by said reel body and is rotatable in only the line winding direction and that rotates together with said handle,
      (b) engagement means provided between said pinion gear and said rotor for engaging and disengaging said pinion gear and said rotor,
      (c) operation means for operating said engagement means, and
      (d) level winding means for moving said spool in the longitudinal direction responsive to the rotation of said handle.

2. A spinning reel as defined in claim 1, wherein said power transmission mechanism further comprises engagement holding means for holding said engagement means in an engaged state.

3. A spinning reel as defined in claim 1, wherein said engagement means transmits power by means of a frictional force, and said operation means adjusts said frictional force so as to perform said engagement and disengagement.

4. A spinning reel as defined in claims 3, wherein said operation means comprises an operating handle that moves with respect to said reel unit and adjusts said frictional force.

5. A spinning reel as defined in claim 4, wherein said operating handle is movably positioned on said reel unit adjacent said mounting leg member, and is moved so as to adjust said frictional force by an operation in which a fishing rod to which said spinning reel is attached is grasped.

6. A spinning reel as defined in claim 5, wherein said engagement means comprises
   (a) a receiving member affixed to said front end of said reel body;
   (b) a receiving plate movably and rotatably mounted on said rotor to the rear of and facing said receiving member; and
   (c) a clutch plate non-rotatably but movably mounted on said pinion gear to the rear of and facing said receiving plate.

7. A spinning reel as defined in claim 6, wherein said operating means further comprises an engagement actuator which is responsive to movement of said operating handle to move said clutch plate against receiving plate.

8. A spinning reel as defined in claim 5, wherein said engagement means comprises
   (a) a ring-shaped receiving member affixed to said front end of said reel body;
   (b) a cup-shaped receiving plate movably and rotatably mounted on said rotor to the rear of and facing said receiving member; and
   (c) a cup-shaped clutch plate non-rotatably but movably mounted on said pinion gear to the rear of and facing said receiving plate.

9. A spinning reel as defined in claim 3, wherein said operation means has a rotating member that, when rotated, moves in the longitudinal direction of said reel unit and adjusts said frictional force.

10. A spinning reel as defined in claim 1, wherein said rotor is rotatably supported by a cylindrical member that rotates integrally with said pinion gear.

11. A spinning reel as defined in claim 1, wherein said level winding means rotates together with said rotor and moves said spool in the longitudinal direction.

12. A spinning reel as defined in claim 1, further comprising linking means for linking said reel body to said mounting leg member whereby said reel body pivots around an axis parallel to the rotational axis of said handle, and adjustment means for adjusting the position of said reel body.

13. A spinning reel as defined in claim 12, wherein said linking means links said reel body to said mounting leg member so that said reel body pivots around said rotational axis of said handle.

14. A rotor drag spinning reel comprising:
   (i) a reel unit comprising
      (a) a reel body, (b) a mounting leg member connected to said reel body, and
(c) a handle rotatable supported by said reel body;
(ii) a rotor that is rotatably supported by said reel body and rotated by said handle;
(iii) a spool disposed on said rotor; and
(iv) a power transmission mechanism for rotating said rotor together with rotation of said handle, said mechanism comprising (a) a pinion gear that is supported by said reel body and is rotatable in only the line winding direction and that rotates together with said handle,
(b) engagement means provided between said pinion gear and said rotor for engaging and disengaging said pinion gear and said rotor, and
(c) operation means for operating said engagement means.

* * * * *